United States Patent
Washiro

(10) Patent No.: US 10,164,719 B2
(45) Date of Patent: Dec. 25, 2018

(54) TRANSMISSION APPARATUS, TRANSMISSION METHOD, AND TRANSMISSION SYSTEM

(71) Applicant: eNFC Inc., Minato-ku, Tokyo (JP)

(72) Inventor: Takanori Washiro, Tokyo (JP)

(73) Assignee: eNFC Inc., Minato-ku, Tokyo (JP)

( * ) Notice: Subject to any disclaimer, the term of this patent is extended or adjusted under 35 U.S.C. 154(b) by 0 days.

(21) Appl. No.: 15/768,171

(22) PCT Filed: Oct. 25, 2016

(86) PCT No.: PCT/JP2016/081613
§ 371 (c)(1),
(2) Date: Apr. 13, 2018

(87) PCT Pub. No.: WO2017/094399
PCT Pub. Date: Jun. 8, 2017

(65) Prior Publication Data
US 2018/0302171 A1  Oct. 18, 2018

(30) Foreign Application Priority Data

Dec. 2, 2015 (JP) .................... 2015-235751

(51) Int. Cl.
- *H04B 13/00* (2006.01)
- *H04W 4/80* (2018.01)
- *H04B 5/00* (2006.01)

(52) U.S. Cl.
CPC ......... *H04B 13/005* (2013.01); *H04B 5/0012* (2013.01); *H04W 4/80* (2018.02)

(58) Field of Classification Search
CPC .... H04B 5/0012; H04B 13/00; H04B 13/005; H04B 2001/3861; H04W 4/80
(Continued)

(56) References Cited

U.S. PATENT DOCUMENTS

| | | | |
|---|---|---|---|
| 6,223,018 B1* | 4/2001 | Fukumoto | H04B 5/00 455/41.1 |
| 8,391,783 B2* | 3/2013 | Washiro | H01Q 1/44 455/41.2 |

(Continued)

FOREIGN PATENT DOCUMENTS

| | | |
|---|---|---|
| JP | 2002246987 A | 8/2002 |
| JP | 2006324774 A | 11/2006 |

(Continued)

OTHER PUBLICATIONS

J.B. Sung et al., Effects of Ground Electrode on Signal Transmission of Human Body Communication Using Human Body as Transmission Medium, Antennas and Propagation Society International Symposium 2006, IEEE, 2006, pp. 191-494, IEEE.

(Continued)

*Primary Examiner* — Quochien B Vuong
(74) *Attorney, Agent, or Firm* — Kenja IP Law PC

(57) ABSTRACT

A transmission apparatus includes a communication unit, including input/output terminals and two coupling electrodes. An input/output circuit of the communication unit is configured to function interchangeably. The two coupling electrodes are arranged along the longitudinal direction of the transmission medium, when coupled to the transmission medium. When the length from one coupling electrode of the two coupling electrodes to one end of the transmission medium in the longitudinal direction thereof is an electrical length in a range of $(2n \cdot 90 \pm 45)°$ of the electrical signal and the length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the communication unit transmits and (Continued)

receives the electrical signal to and from another transmission apparatus.

8 Claims, 21 Drawing Sheets

(58) Field of Classification Search
USPC .............................. 455/41.1, 41.2, 41.3, 899
See application file for complete search history.

(56) References Cited

U.S. PATENT DOCUMENTS

| | | | | |
|---|---|---|---|---|
| 8,421,748 | B2* | 4/2013 | Tanaka | H04B 13/005 455/41.1 |
| 8,509,689 | B2* | 8/2013 | Nakamura | H04B 13/005 455/41.2 |
| 8,594,564 | B2* | 11/2013 | Kurata | H04B 13/005 455/41.1 |
| 10,008,756 | B2* | 6/2018 | Harada | H02J 17/00 |

FOREIGN PATENT DOCUMENTS

| | | |
|---|---|---|
| JP | 2011508499 A | 3/2011 |
| JP | 2013148954 A | 8/2013 |
| WO | 2015170367 A1 | 11/2015 |

OTHER PUBLICATIONS

Jan. 17, 2017, International Search Report issued in the International Patent Application No. PCT/JP2016/081613.

Joonsung Bae et al., A 0.24-nJ/b Wireless Body-Area-Network Transceiver With Scalable Double-FSK Modulation, IEEE Journal of Solid-State Circuits, Jan. 2012, pp. 310-322, vol. 47, Issue 1, IEEE.

Katsuyuki Fujii et al., Electric Field Distributions of Wearable Devices Using the Human Body as a Transmission Channel, IEEE Transactions on Antennas and Propagation, Jul. 2007, pp. 2080-2087, vol. 55, Issue 7, IEEE.

Jun. 5, 2018, International Preliminary Report on Patentability issued in the International Patent Application No. PCT/JP2016/081613.

* cited by examiner

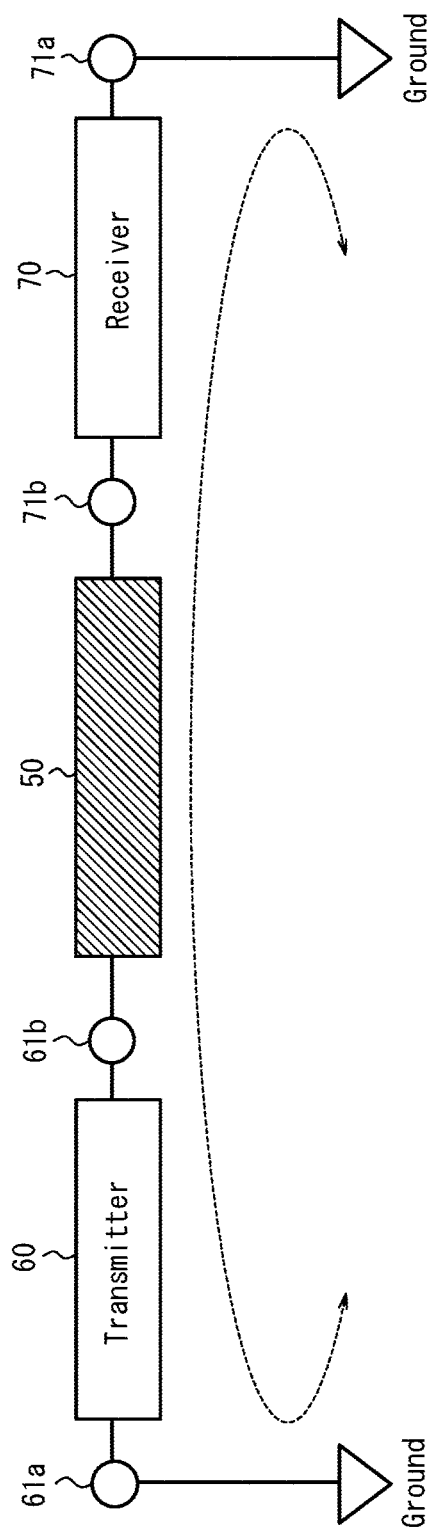

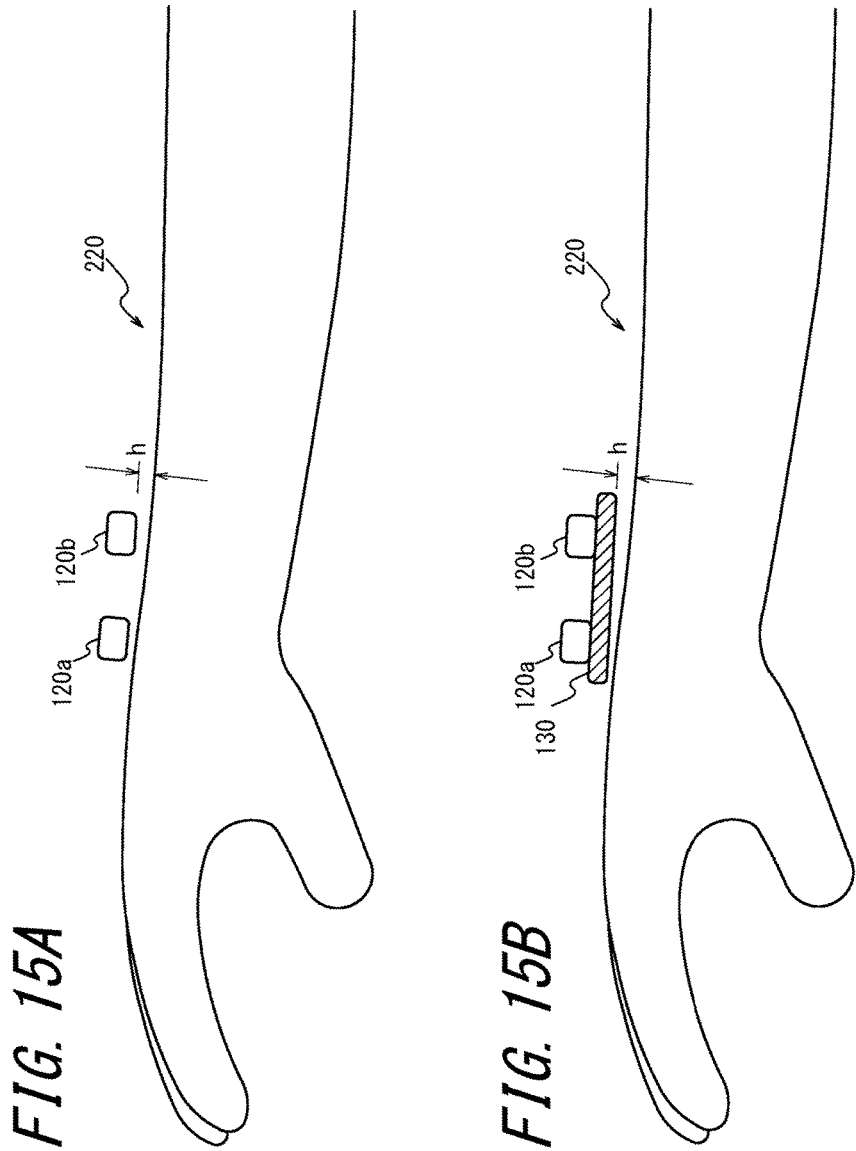

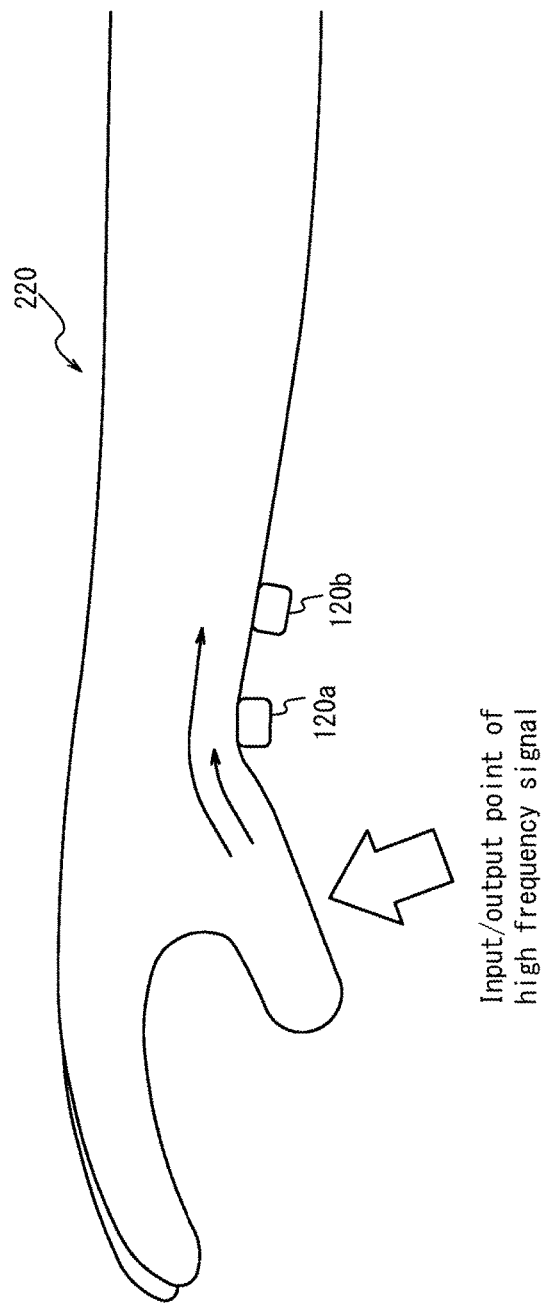

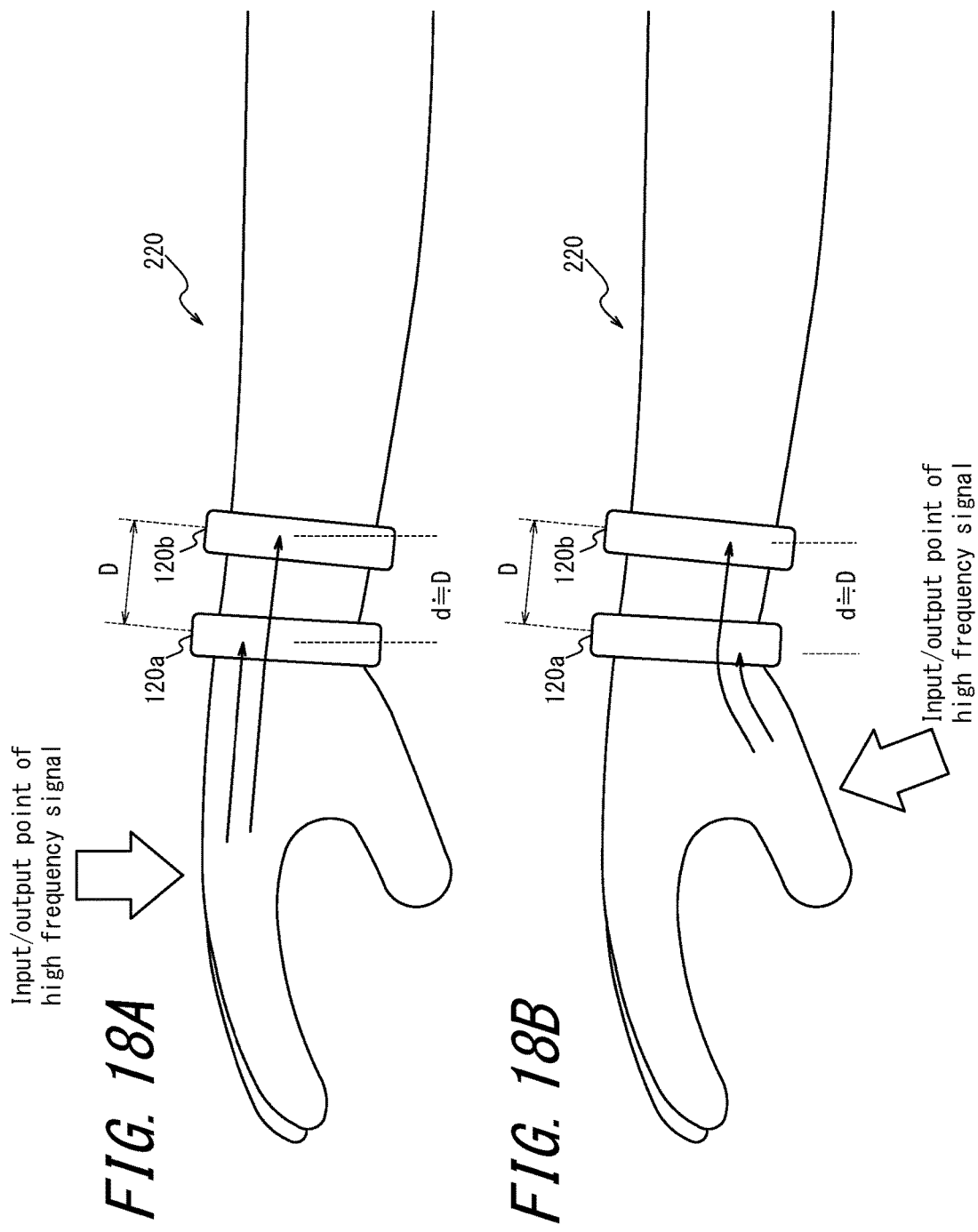

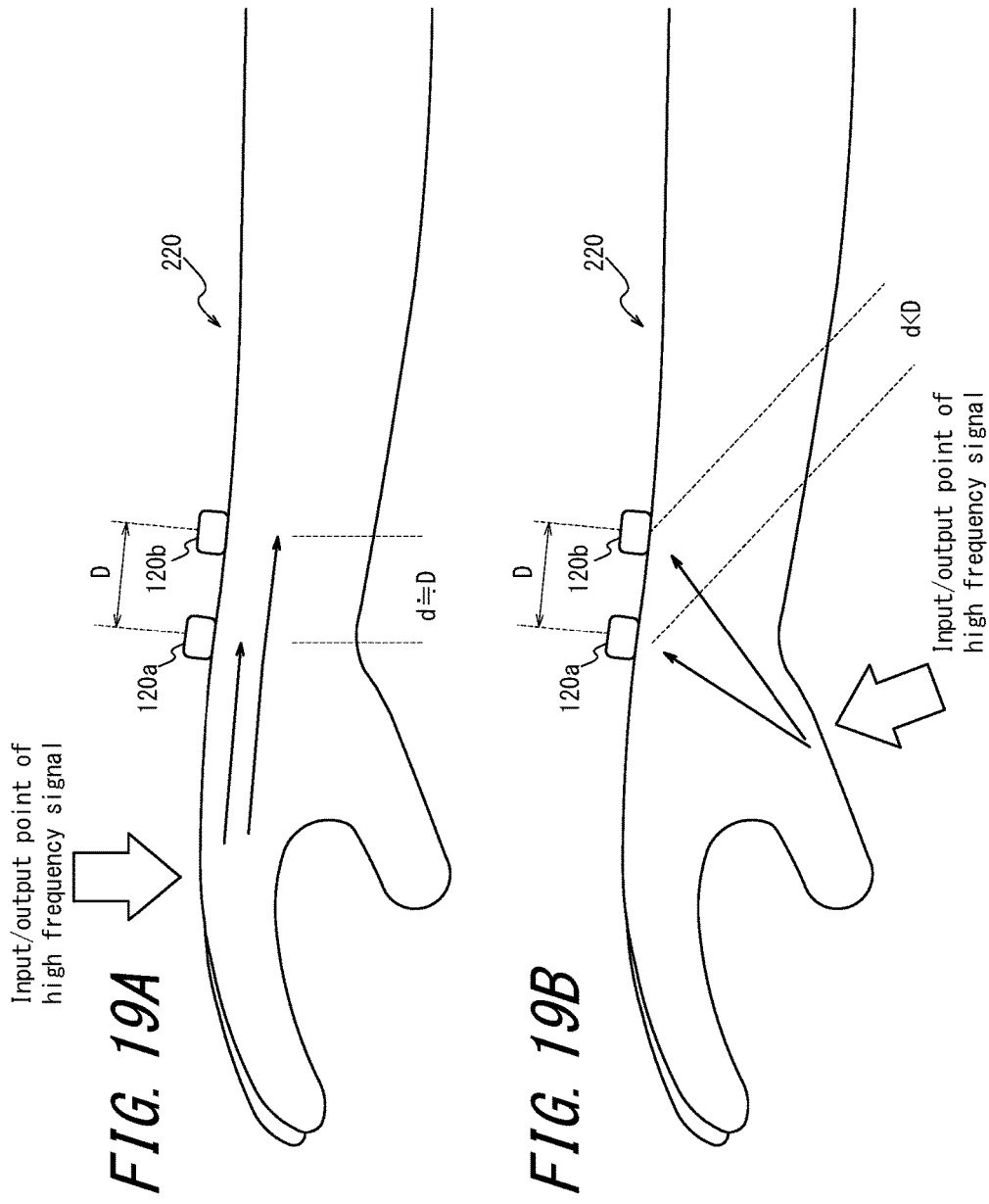

TRANSMISSION APPARATUS, TRANSMISSION METHOD, AND TRANSMISSION SYSTEM

CROSS-REFERENCE TO RELATED APPLICATION

The present application claims priority to and the benefit of Japanese Patent Application No. 2015-235751 filed Dec. 2, 2015, the entire contents of which are incorporated herein by reference.

TECHNICAL FIELD

The present disclosure relates to a transmission apparatus, a transmission method, and a transmission system that transmit a high frequency signal or high frequency electric power through a transmission medium formed by a conductor or a dielectric.

BACKGROUND

A human body communication system that uses a human body, which is a dielectric, as a transmission medium is known. In the human body communication system, communication with a communication apparatus is established when the human body touches an electrode of the transmission apparatus, whereas communication with the communication apparatus is not established when the human body is not touching an electrode of the transmission apparatus. Patent literature (PTL) 1 and PTL 2, for example, disclose examples of a human body communication system.

PTL 1 discloses a technique to transmit a signal to a reception apparatus from a transmission apparatus provided with an electrode electrostatically coupled to a human body that is a transmission medium. PTL 2 discloses a technique for transmitting ID information and fingerprint information from a human body communication card holder through a human body to a control apparatus through a floor electrode disposed in the floor.

CITATION LIST

Patent Literature

PTL 1: JP 2006-324774 A
PTL 2: JP 2013-148954 A

SUMMARY

Technical Problem

Since communication is established in a human body communication system when the human body, which is a transmission medium, touches an electrode of a transmission apparatus, communication occurs even when the human body unintentionally touches the electrode. When such unintentional communication occurs, certain information might be transmitted to a transmission apparatus unintentionally by the communication. When the information transmitted to the transmission apparatus is, for example, ID information or biometric information used for authentication or the like, or information related to a financial or other transaction, then the information could become known to a third party that was not supposed to learn such information.

In light of these considerations, it would be helpful to provide a transmission apparatus, a transmission method, and a transmission system that can improve safety.

Solution to Problem

To this end, a transmission apparatus according to a first aspect comprises:

a communication unit comprising input/output terminals configured to input and output an electrical signal of a predetermined frequency; and two coupling electrodes each configured to couple to the input/output terminals and to couple to one transmission medium so as to be side-by-side in a longitudinal direction of the transmission medium; wherein an input/output circuit of the communication unit is configured by a balanced circuit capable of causing the two coupling electrodes to function interchangeably;

the two coupling electrodes are arranged along the longitudinal direction of the transmission medium, when coupled to the transmission medium, at positions symmetrical with respect to a plane orthogonal to a direction in which the electrical signal flows; and when a length from one coupling electrode of the two coupling electrodes to one end of the transmission medium in the longitudinal direction thereof is an electrical length in a range of $(2n \cdot 90 \pm 45)°$, where n is an integer of at least 0, of the electrical signal and a length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the communication unit transmits and receives the electrical signal to and from another transmission apparatus, coupled to a range of the transmission medium having an electrical length in a range of $(2n \cdot 90 \pm 45)°$ of the electrical signal, by a region of the transmission medium, from a position where the another coupling electrode is coupled to the another end, functioning as ground when the two coupling electrodes are coupled to the transmission medium.

A transmission apparatus according to a second aspect further comprises:

a support having a greater area than an area of a coupling surface between the two coupling electrodes and the transmission medium, the support being in close contact with the two coupling electrodes; wherein the two coupling electrodes couple to the transmission medium through the support.

A transmission apparatus according to a third aspect further comprises an inductor between the communication unit and each of the two coupling electrodes.

In a transmission apparatus according to a fourth aspect, the two coupling electrodes each have a ring shape.

A transmission apparatus according to a fifth aspect further comprises an inductor between the two coupling electrodes.

In a transmission apparatus according to a sixth aspect, the transmission medium is a conductor or a dielectric.

A transmission method according to a seventh aspect is for a transmission apparatus, the transmission apparatus comprising a communication unit comprising input/output terminals configured to input and output an electrical signal of a predetermined frequency, and two coupling electrodes each configured to couple to the input/output terminals and to couple to one transmission medium so as to be side-by-side in a longitudinal direction of the transmission medium;

an input/output circuit of the communication unit being configured by a balanced circuit capable of causing the two coupling electrodes to function interchangeably;

the two coupling electrodes being arranged along the longitudinal direction of the transmission medium, when coupled to the transmission medium, at positions symmetrical with respect to a plane orthogonal to a direction in which the electrical signal flows;

the transmission method comprising:

the communication unit transmitting and receiving the electrical signal, when a length from one coupling electrode of the two coupling electrodes to one end of the transmission medium in the longitudinal direction thereof is an electrical length in a range of $(2n \cdot 90 \pm 45)°$, where n is an integer of at least 0, of the electrical signal and a length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the electrical signal being transmitted and received to and from another transmission apparatus, coupled to a range of the transmission medium having an electrical length in a range of $(2n \cdot 90 \pm 45)°$ of the electrical signal, by a region of the transmission medium, from a position where the another coupling electrode is coupled to the another end, functioning as ground when the two coupling electrodes are coupled to the transmission medium.

A transmission system according to an eighth aspect comprises:

a transmission apparatus comprising a communication unit, comprising input/output terminals configured to input and output an electrical signal of a predetermined frequency, and two coupling electrodes each configured to couple to the input/output terminals and to couple to one transmission medium so as to be side-by-side in a longitudinal direction of the transmission medium, an input/output circuit of the communication unit being configured by a balanced circuit capable of causing the two coupling electrodes to function interchangeably, and the two coupling electrodes being arranged along the longitudinal direction of the transmission medium, when coupled to the transmission medium, at positions symmetrical with respect to a plane orthogonal to a direction in which the electrical signal flows; and another transmission apparatus comprising a communication unit and a coupling electrode, the communication unit comprising an input/output terminal configured to input and output an electrical signal of a predetermined frequency, and the coupling electrode being coupled to the input/output terminal, wherein when a length from one coupling electrode of the two coupling electrodes of the transmission apparatus to one end of the transmission medium in the longitudinal direction thereof is an electrical length in a range of $(2n \cdot 90 \pm 45)°$, where n is an integer of at least 0, of the electrical signal and a length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the transmission apparatus transmits and receives the electrical signal to and from the another transmission apparatus, coupled to a range of the transmission medium having an electrical length in a range of $(2n \cdot 90 \pm 45)°$ of the electrical signal, by a region of the transmission medium, from a position where the another coupling electrode is coupled to the another end, functioning as ground when the two coupling electrodes are coupled to the transmission medium.

Other aims, features, and advantages of the present disclosure will become clear in the detailed description below, which is based on embodiments of the present disclosure and the attached drawings.

BRIEF DESCRIPTION OF THE DRAWINGS

In the accompanying drawings:

FIG. 4 schematically illustrates operation of the high frequency transmission system in FIG. 1;

FIG. 15A and FIG. 15B schematically illustrate an example of wearing a transmission apparatus on a human body;

FIG. 17 schematically illustrates yet another example of wearing a transmission apparatus on a human body;

FIG. 18A and FIG. 18B schematically illustrate an example of the form of coupling electrodes in a transmission apparatus;

FIG. 19 illustrates the relationship between the distance between coupling electrodes as seen from the high frequency signal transmitted through the human body and the actual distance between coupling electrodes;

DETAILED DESCRIPTION

An embodiment of the present disclosure is described below with reference to the drawings.

First, the principle behind high frequency transmission in the high frequency transmission system using a transmission apparatus according to the present embodiment is described with reference to FIG. 1 through FIG. 5B.

Figure 1:
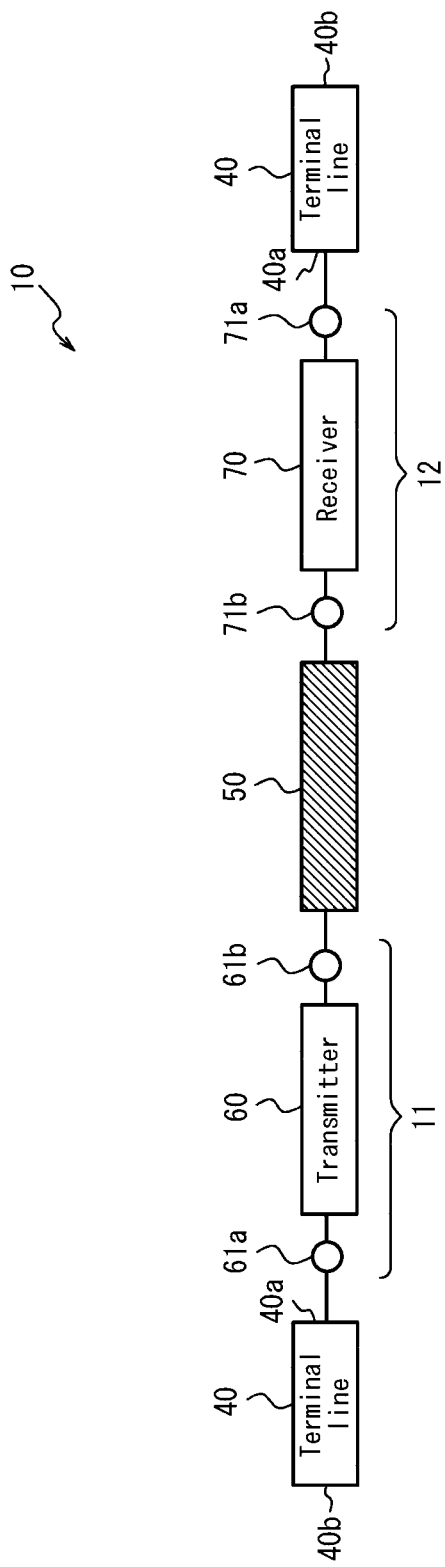
FIG. 1 is a functional block diagram illustrating the schematic configuration of a high frequency transmission system that includes a transmission apparatus according to an embodiment of the present disclosure.

FIG. 1 is a functional block diagram illustrating the schematic configuration of a high frequency transmission system using a transmission apparatus according to an embodiment of the present disclosure. As illustrated in FIG. 1, a high frequency transmission system 10 includes two high frequency transmission apparatuses 11 and 12. The high frequency transmission apparatuses 11 and 12 are connected electrically to a transmission medium 50. In the high frequency transmission system 10, one high frequency transmission apparatus 11 transmits a high frequency signal or electric power through the transmission medium 50, and the other high frequency transmission apparatus 12 receives the high frequency signal or electric power through the transmission medium 50. The high frequency transmission apparatus 11 on the transmitting side includes a transmitter 60, and the high frequency transmission apparatus 12 on the receiving side includes a receiver 70.

Instead of the transmitter 60 or the receiver 70, the high frequency transmission apparatuses 11 and 12 may each include a transceiver that has both a transmitter function and a receiver function. In this case, by the transceiver performing either the transmitter function or the receiver function, the high frequency transmission apparatuses 11 and 12 can respectively perform transmission and reception operations. As illustrated in FIG. 1, the transmitter 60 includes output terminals 61a and 61b at either end, and the receiver 70 includes input terminals 71a and 71b at either end. Here, the transmitter, receiver, and transceiver correspond to the "communication unit" of the present disclosure.

The high frequency transmission apparatus 11 includes two output terminals 61a and 61b. The output terminal 61a is coupled electrically (hereinafter simply "coupled") to a terminal line 40 that is formed by a conductor, such as metal, or a dielectric. The output terminal 61b is coupled to the transmission medium 50, which is formed by a conductor, such as metal, or a dielectric.

The transmitter 60 in the high frequency transmission apparatus 11 includes a controller that controls transmission operations in the transmitter 60. The transmitter 60 communicates (transmits) a high frequency signal or electric power through the transmission medium 50 with another high frequency transmission apparatus 12 coupled to the transmission medium 50.

The high frequency transmission apparatus 12 includes two input terminals 71a and 71b. The input terminal 71a is coupled electrically to a terminal line 40 that is formed by a conductor, such as metal, or a dielectric. The input terminal 71b is coupled to the transmission medium 50, which is formed by a conductor, such as metal, or a dielectric.

The receiver 70 in the high frequency transmission apparatus 12 includes a controller that controls reception operations in the receiver 70. The receiver 70 communicates (receives) a high frequency signal or electric power through the transmission medium 50 with another high frequency transmission apparatus 11 transmission medium coupled to the transmission medium 50.

When a high frequency signal or electric power is transmitted in the high frequency transmission system 10, current flows to the terminal line 40 from the output terminal 61a of the transmitter 60 connected to the terminal line 40. At the same time, current of the same magnitude as the current flowing to the terminal line 40 flows in the opposite direction from the other output terminal 61b to the transmission medium 50. In this way, the transmitter 60 sends a high frequency signal or electric power to the transmission medium 50.

On the other hand, current flows into the receiver 70 from the input terminal 71b coupled to the transmission medium 50. At the same time, current of the same magnitude as the current provided to the receiver 70 flows in the opposite direction from the terminal line 40 to the other input terminal 71a. In this way, the receiver 70 receives a high frequency signal or electric power from the transmission medium 50.

The terminal line 40 has an electrical length of 90°. An electrical length of 90° means that the length of the line from the end 40a connected to the output terminal 61a or the input terminal 71a to the other end 40b is one quarter of the wavelength of the high frequency signal to be transmitted. In other words, the phase of the high frequency signal to be transmitted advances 90° over the length from the end 40a connected to the output terminal 61a or the input terminal 71a to the other end 40b.

Consequently, the current that flows to the terminal line 40 side from the end 40a, which is connected to the output terminal 61a or the input terminal 71a, is subsequently reflected at the other end 40b of the terminal line 40 and returns to the end 40a connected to the output terminal 61a or the input terminal 71a, thereby traversing a distance of half a wavelength. The phase thus advances 180°.

Figure 2:
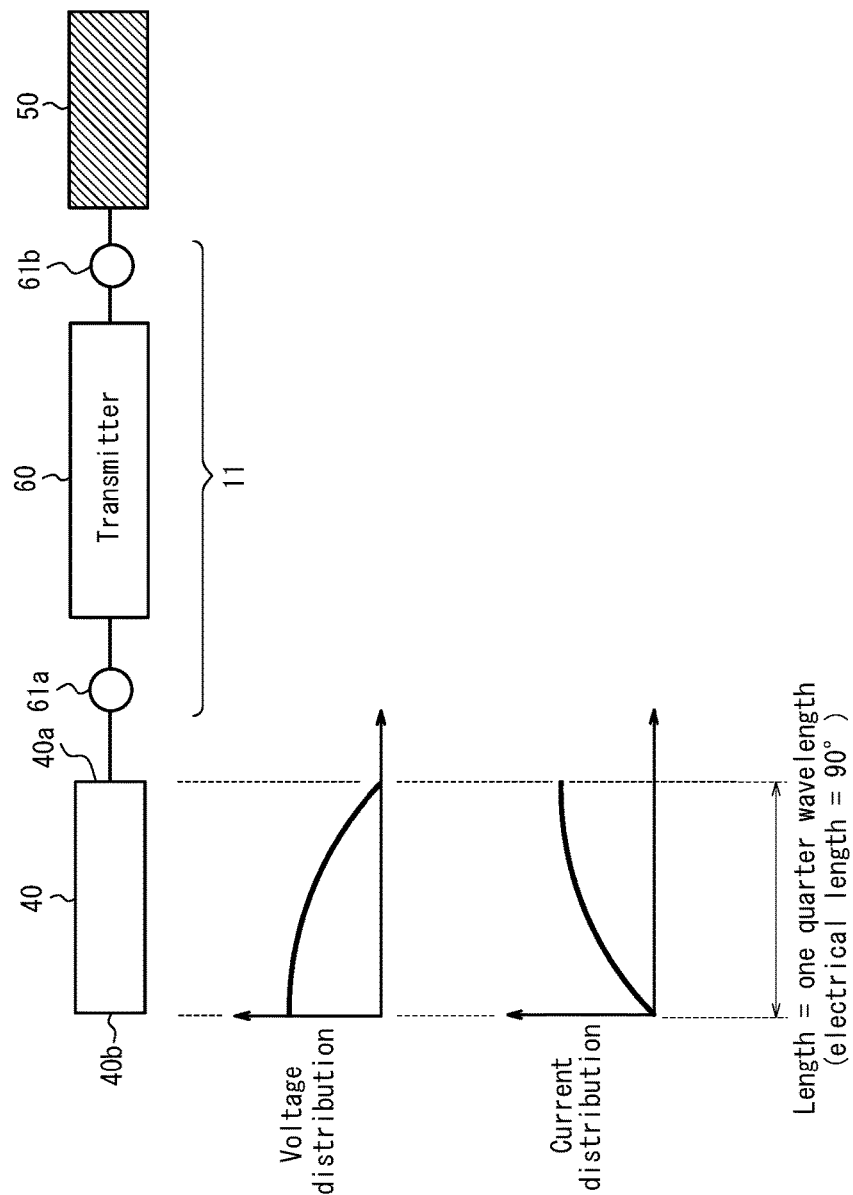
FIG. 2 schematically illustrates the mechanism behind operation of the terminal line in FIG. 1.

At this time, as illustrated in FIG. 2, the transmitter 60 inputs a high frequency signal to the terminal line 40, which has an electrical length of 90°, i.e. one quarter of the wavelength of the high frequency signal to be transmitted, and the end 40b of which is open. Consequently, a standing wave is generated in the terminal line 40, with maximum voltage amplitude and zero current amplitude at the end 40b and zero voltage amplitude and maximum current amplitude at the end 40a, and current flows to the end 40a. In other words, when the terminal line 40 has an electrical length of 90°, the voltage amplitude at the end 40a is zero, but current flows. Hence, as illustrated schematically in FIG. 3, the end 40a behaves as though it were virtually short circuited to ground. The output terminal 61a and the input terminal 71a connected to the terminal line 40 can thus be considered short-circuit terminals that are virtually connected to ground.

As illustrated in FIG. 2, the current that flows into the output terminal 61a and the input terminal 71a is maximized when the electrical length of the terminal line 40 is 90°, i.e. when the signal input from the end 40a of the terminal line 40 connected to the output terminal 61a of the transmitter 60 and the input terminal 71a of the receiver 70 is reflected at the other end 40b and returns so that the phase of the reflected wave is 180°. Consequently, the high frequency transmission system 10 operates most effectively when the electrical length of the terminal line 40 is 90°. However, a certain advantage in high frequency transmission is still obtained when the high frequency transmission system 10 operates with the electrical length of the terminal line 40 within a range of ±45° of 90°, i.e. with the phase of the reflected wave being in a range greater than 90° and smaller than 270°. It thus suffices for the terminal line 40 to have an electrical length of substantially 90°, which includes a range of ±45° from 90°.

FIG. 4 illustrates the principles explained with reference to FIG. 3 in association with the overall high frequency transmission system 10 of FIG. 1. As illustrated in FIG. 4, the output terminal 61a of the transmitter 60 short circuits virtually to ground due to a terminal line 40 that has an electrical length of 90°, and the input terminal 71a of the receiver 70 short circuits virtually to ground due to another terminal line 40 that has an electrical length of 90°. By being coupled to the transmission medium 50, the output terminal 61b of the transmitter 60 and the input terminal 71b of the receiver 70 are connected through the transmission medium 50. Although the high frequency transmission system 10 is actually an open circuit formed by only one transmission path through one transmission medium 50, the system overall behaves as though it were a closed circuit through a virtual ground, thereby allowing a high frequency signal or electric power to be transmitted stably from the transmitter 60 to the receiver 70.

In this way, the high frequency transmission system 10 according to the present embodiment provided with a terminal circuit connected to the transmitter 60, the transmitter 60, the receiver 70, and a terminal circuit connected to the receiver can transmit a high frequency signal or electric power from the transmitter 60 to the receiver 70 through one transmission medium 50 over an open circuit formed by only one transmission path.

With this configuration, the high frequency transmission apparatus 11 transmits a high frequency signal or electric power when coupled to the transmission medium 50 and does not transmit when not coupled. Therefore, a highly stable high frequency transmission system that is easy to design, has a simple configuration, and is not easily affected by the external environment can be provided.

Figure 5A:
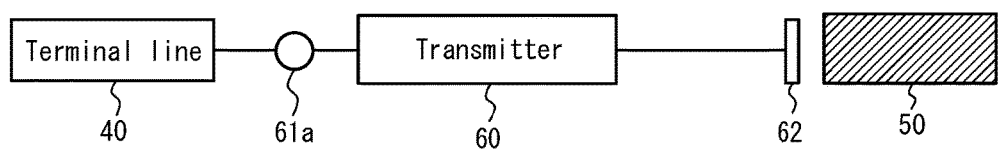
FIG. 5A and FIG. 5B schematically illustrate an example of a coupling method between the high frequency transmission apparatus and a transmission medium.

The transmission medium 50 becomes a medium that transmits a high frequency signal or electric power between the transmitter 60 and the receiver 70. The transmission medium 50 is configured to include a conductor, a dielectric, or a combination of a conductor and a dielectric. The coupling between the transmission medium 50 and the output terminal 61b of the transmitter 60 may, as illustrated in FIG. 5A, be achieved by providing a coupling electrode 62 on the output terminal 61b of the transmitter 60 and having the coupling electrode 62 and the surface of the transmission medium 50 undergo capacitive coupling when the coupling electrode 62 and the transmission medium 50 come close to each other. Such coupling can be applied similarly to the receiver 70. In this case, no high frequency signal or electric power is transmitted when the coupling electrode 62 of the transmitter 60 and the coupling electrode of the receiver 70 do not come close to the transmission medium 50. Conversely, when the coupling electrode 62 of the transmitter 60 and the coupling electrode of the receiver 70 come close to the transmission medium 50, a high frequency signal or electric power is transmitted through the transmission medium 50 from the transmitter 60 to the receiver 70.

Figure 5B:
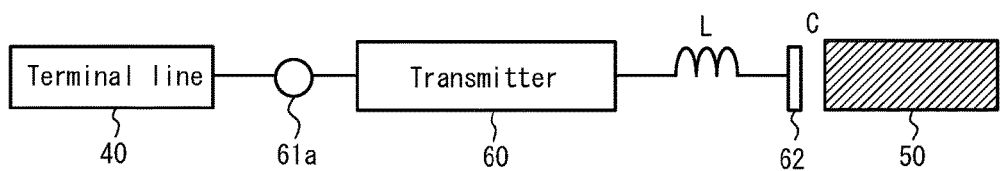

When the transmission medium 50 is a conductor or a dielectric, and coupling between the transmission medium 50 and the output terminal 61b of the transmitter 60 is achieved by capacitive coupling between the surface of the transmission medium 50 and a coupling electrode 62 provided on the output terminal 61b of the transmitter 60, then as illustrated in FIG. 5B, a coil may be further provided between the coupling electrode 62 and the output terminal 61b of the transmitter 60. In this case, LC series resonance is generated by the inductance (L) of the coil and the capacitance (C) between the coupling electrode 62 and the surface of the transmission medium 50. Such coupling can be applied similarly to the receiver 70.

The values of the inductance L and the capacitance C satisfy Expression (1) below when generating LC series resonance, where f is the frequency of the high frequency signal or electric power to be transmitted.

$$2\pi f = \frac{1}{\sqrt{LC}} \quad (1)$$

In this case, no high frequency signal or electric power is transmitted when the coupling electrode 62 of the transmitter 60 and the coupling electrode of the receiver 70 do not come close to the transmission medium 50. Conversely, when the coupling electrode 62 of the transmitter 60 and the coupling electrode of the receiver 70 come close to the transmission medium 50, a high frequency signal or electric power is transmitted through the transmission medium 50 from the transmitter 60 to the receiver 70. When generating LC series resonance at this time, the output terminal 61b and input terminal 71b are coupled more strongly with the transmission medium 50 than when only being coupled by capacitive coupling without using LC series resonance. A high frequency signal or electric power can thus be transmitted efficiently.

Next, a transmission apparatus according to the present embodiment is described in detail with reference to FIG. 6 through FIG. 11.

Figure 6:
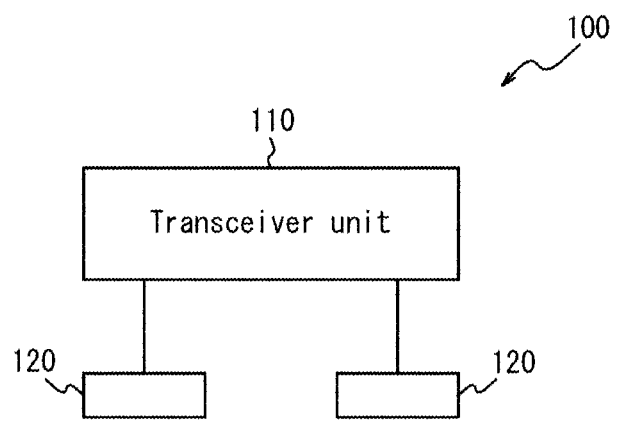
FIG. 6 is a functional block diagram illustrating the schematic configuration of a transmission apparatus according to an embodiment of the present disclosure.

FIG. 6 is a functional block diagram illustrating the schematic configuration of a transmission apparatus according to an embodiment of the present disclosure. A transmission apparatus 100 includes a transceiver 110 and two coupling electrodes 120 coupled to the transceiver 110. The transmission apparatus 100 is used by being coupled to one dielectric.

The transceiver 110 has the functions of the transmitter 60 and the receiver 70 in the high frequency transmission system 10 illustrated in FIG. 1. In other words, the transceiver 110 controls operations to transmit and receive a high frequency signal or electric power in the transmission apparatus 100.

The coupling electrodes 120 are electrodes used for coupling the transmission apparatus 100 and a dielectric. The coupling electrode 62 in FIG. 5A and FIG. 5B corresponds to one of the two coupling electrodes 120 in the transmission apparatus 100.

Figure 7:
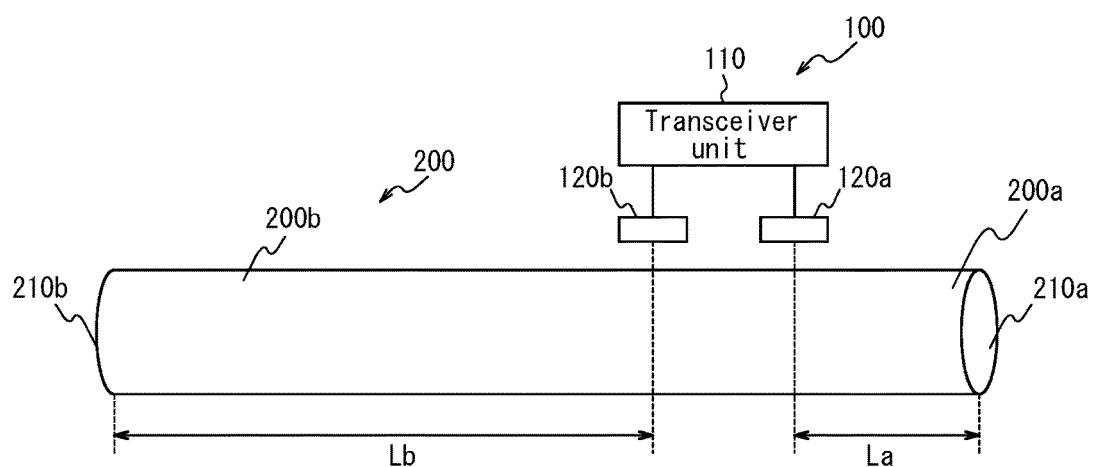
FIG. 7 schematically illustrates the state in which the transmission apparatus in FIG. 6 is coupled to a dielectric.

FIG. 7 schematically illustrates the state in which the transmission apparatus 100 is coupled to a dielectric 200. As illustrated schematically in FIG. 7, for example, the transmission apparatus 100 is used while coupled to the dielectric 200. In other words, the transmission apparatus 100 sends and receives a high frequency signal or electric power while coupled to the dielectric 200. In the example in FIG. 7, the dielectric 200 has a cylindrical shape with a first bottom (first end) 210a and a second bottom (second end) 210b. The height of the cylindrical dielectric 200 is greater than the diameter of the bottoms (the first bottom 210a and second bottom 210b) of the dielectric 200. The height direction of the cylinder is also referred to as the longitudinal direction.

When the transmission apparatus 100 is used, the transmission apparatus 100 is coupled to the dielectric 200 so that the two coupling electrodes 120 are side-by-side in the longitudinal direction of the dielectric 200. Of the two coupling electrodes 120, the one that is closer to the first bottom 210a when the transmission apparatus 100 is coupled to the dielectric 200 is assumed to be the coupling electrode 120a, and the one that is closer to the second bottom 210b is assumed to be the coupling electrode 120b.

In the dielectric 200 to which the transmission apparatus 100 is coupled, the region from the position at which the coupling electrode 120a is coupled towards the first bottom 210a is referred to as a first region 200a, and the region from the position at which the coupling electrode 120b is coupled towards the second bottom 210b is referred to as a second region 200b. The height of the first region 200a (the length in the longitudinal direction) is referred to as La, and the height of the second region 200b as Lb. By the two coupling electrodes 120 of the transmission apparatus 100 being coupled to the dielectric 200 at the below-described predetermined positions, the first region 200a functions as a transmission medium in a high frequency transmission system, and the second region 200b functions as a terminal line.

Figure 8:
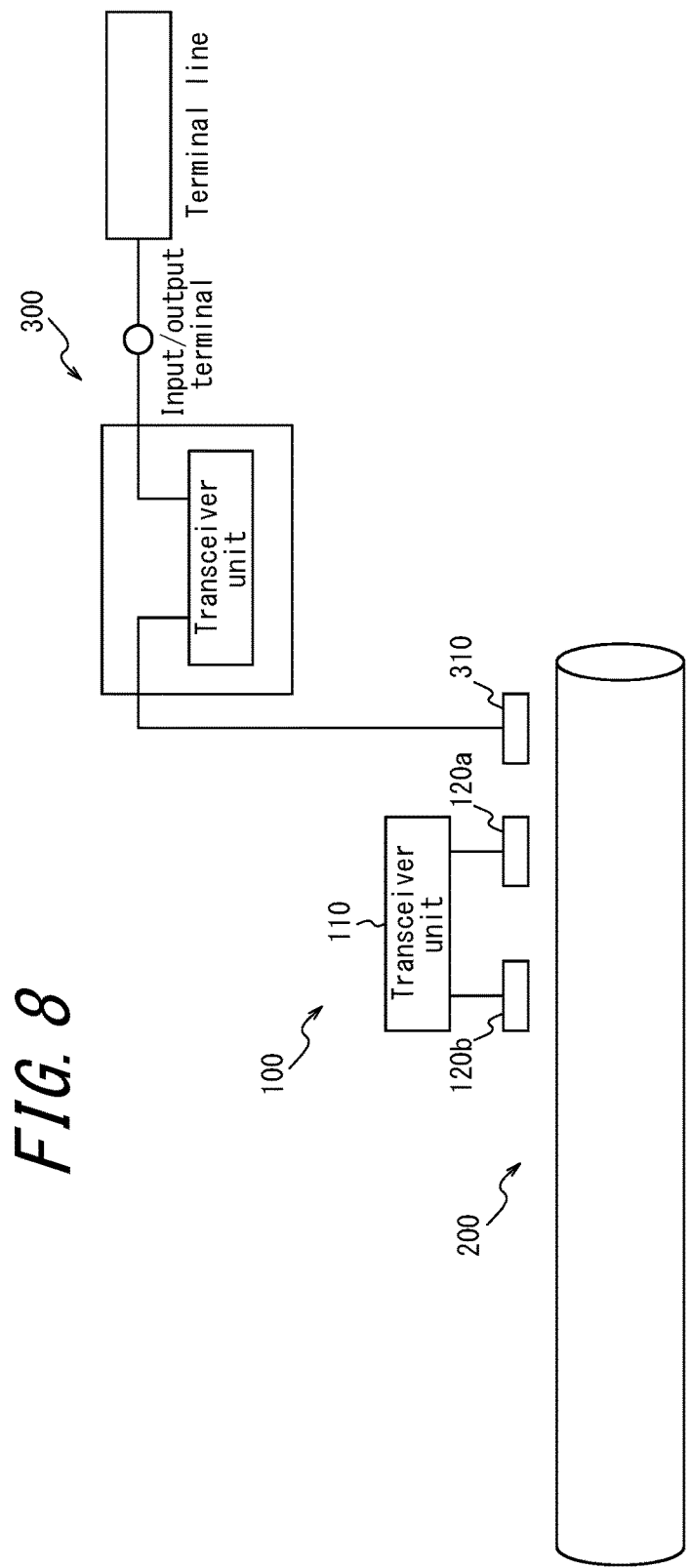
FIG. 8 illustrates an example high frequency transmission system configured using the transmission apparatus of FIG. 6.

Here, the predetermined positions for the first region 200a to function as a transmission medium and the second region 200b to function as a terminal line are described. The transmission apparatus 100 is coupled to the dielectric 200 at a position such that the length Lb becomes an electrical length of $((2n+1)\cdot 90)°$ (where n is an integer of at least 0). When the length Lb is an electrical length of $((2n+1)\cdot 90)°$, a high frequency transmission system is established by the transmission apparatus 100, the dielectric 200, and another transmission apparatus 300 upon the first region 200a coupling with a coupling electrode 310 of the other transmission apparatus 300, as illustrated in FIG. 8. In this case, by the principle explained with reference to FIG. 2, a standing wave is generated with a maximum voltage amplitude and zero current amplitude at the second bottom 210b of the second region 200b and zero voltage amplitude and maximum current amplitude at the end of the second region 200b where the coupling electrode 120b is coupled. From the transceiver 110, current thus flows towards the second region 200b of the dielectric 200 through the coupling electrode 120b, and current flows towards the first region 200a through the coupling electrode 120a. Consequently, the transmission apparatus 100 can communicate with the other transmission apparatus 300, using the first region 200a as a transmission medium. In this way, the second region 200b functions as the terminal line 40 illustrated in FIG. 2.

As explained with reference to FIG. 2, a certain advantage in high frequency transmission is still obtained when the electrical length of the terminal line 40 is within a range of ±45° of 90°, i.e. when the phase of the reflected wave is greater than 90° and smaller than 270°. Therefore, for the second region 200b to function as a terminal line, coupling at a position such that the length Lb becomes an electrical length in a range of $((2n+1)\cdot 90\pm 45)°$ is sufficient.

Figure 9:
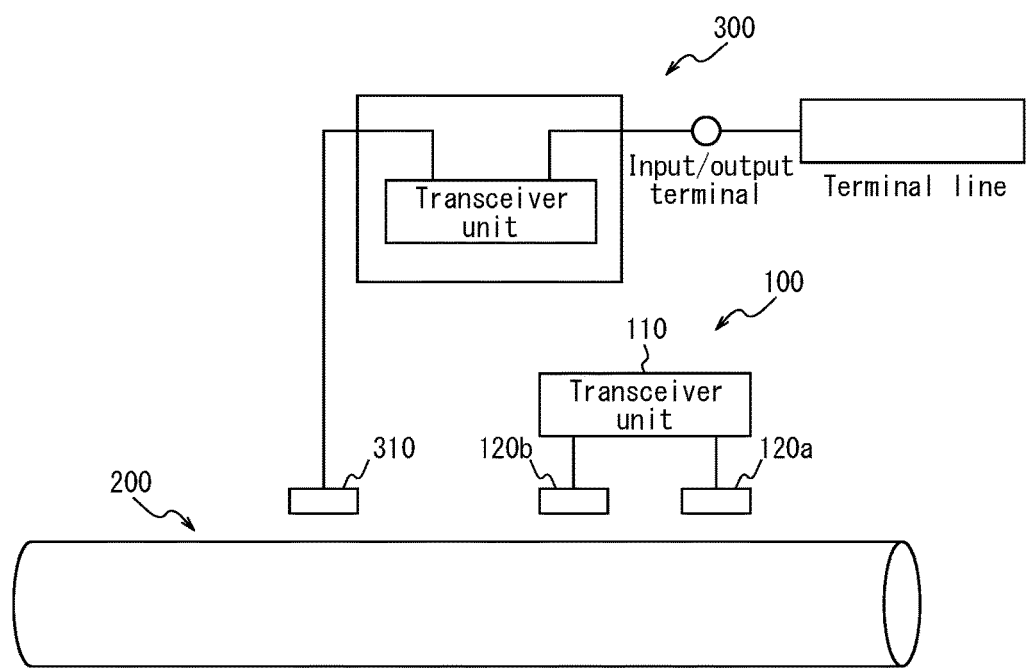
FIG. 9 illustrates an example, in which communication is not established, of coupling a transmission apparatus, a dielectric, and another transmission apparatus.

Here, the transmission apparatus 100 according to the present embodiment is coupled to the dielectric 200 at a position such that the length La becomes an electrical length of $(2n\cdot 90)°$. If the length La were also an electrical length of $((2n+1)\cdot 90)°$ like the length Lb, then the first region 200a would function as a terminal line and the second region 200b would function as a transmission medium upon the second region 200b coupling with a coupling electrode 310 of another transmission apparatus 300, as illustrated in FIG. 9. In other words, in this configuration, either the first region 200a or the second region 200b can function as a terminal line.

However, when the transmission apparatus 100 is coupled to the dielectric 200 at a position such that the length La of the first region 200a is an electrical length of $(2n\cdot 90)°$, the standing wave illustrated in FIG. 2 is not generated at the end on the side where the coupling electrode 120a of the first region 200a is coupled. Consequently, even if the second region 200b couples to the coupling electrode 310 of the other transmission apparatus 300, as illustrated in FIG. 9, the first region 200a does not function as the terminal line 40, and no virtual ground is formed, preventing the establishment of communication between the transmission apparatus 100 and the other transmission apparatus 300.

In this way, when the transmission apparatus 100 is coupled at a position such that the length La of the first region 200a is an electrical length of $(2n\cdot 90)°$ and the length Lb of the second region 200b is an electrical length of $((2n+1)\cdot 90)°$, the second region 200b of the dielectric 200 functions as a terminal line, whereas the first region 200a of the dielectric 200 does not function as a terminal line. Hence, the transmission apparatus 100 establishes communication when the coupling electrode 310 of the other transmission apparatus 300 is coupled to the first region 200a but does not establish communication when the coupling electrode 310 is coupled to the second region 200b.

In this way, by coupling the transmission apparatus 100 to a predetermined position of the dielectric 200, a region allowing establishment of communication and a region not allowing establishment of communication upon coupling with the coupling electrode 310 can be formed in the dielectric 200. In other words, the region allowing establishment of communication in the dielectric 200 can be restricted in this way. Consequently, the region allowing establishment of communication can be restricted when the transmission apparatus 100 is coupled at the predetermined position on the dielectric 200, reducing the likelihood of unintended communication and facilitating prevention of unintended information leaks. The transmission apparatus 100 improves safety with respect to this point.

It suffices for the transmission apparatus 100 to be coupled at a position where the length La of the first region 200a is such that no standing wave is generated in the first region 200a. It therefore suffices for the transmission apparatus 100 to be coupled at a position such that the length La becomes an electrical length in a range of $(2n\cdot 90\pm 45)°$.

To simplify the explanation, the coupling electrodes 120a and 120b of the transmission apparatus 100 are described below as respectively being coupled at positions such that the length La becomes an electrical length of less than 45° (⅛ of a wavelength) and the length Lb becomes an electrical length of 90° (¼ of a wavelength). In this case, if the dielectric constant and shape of the dielectric 200 are uniform, the length Lb is greater than the length La.

Figure 10:
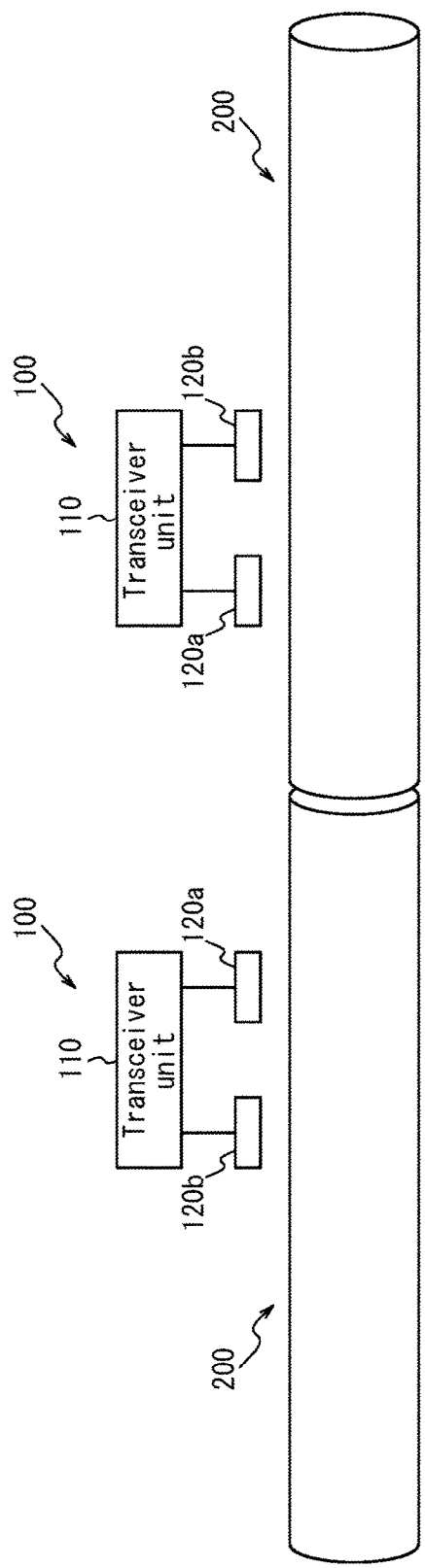
FIG. 10 illustrates another example high frequency transmission system configured using the transmission apparatus of FIG. 6.

In the above embodiment, an example in which communication is established by a dielectric 200, to which a transmission apparatus 100 is coupled, and another transmission apparatus 300 has been described, but the high frequency transmission system is not limited to this configuration. For example, the high frequency transmission system can be configured by coupling together two dielectrics 200, each of which has a transmission apparatus 100 coupled thereto, as illustrated in FIG. 10. Specifically, the high frequency transmission system illustrated in FIG. 10 is configured by coupling together the first regions 200a of two dielectrics 200 that each have a transmission apparatus 100 coupled thereto at a predetermined position. With this configuration, the second regions 200b of the two dielectrics 200 each function as a terminal line, thereby functioning as a virtual ground. Communication is therefore established.

Figure 11:
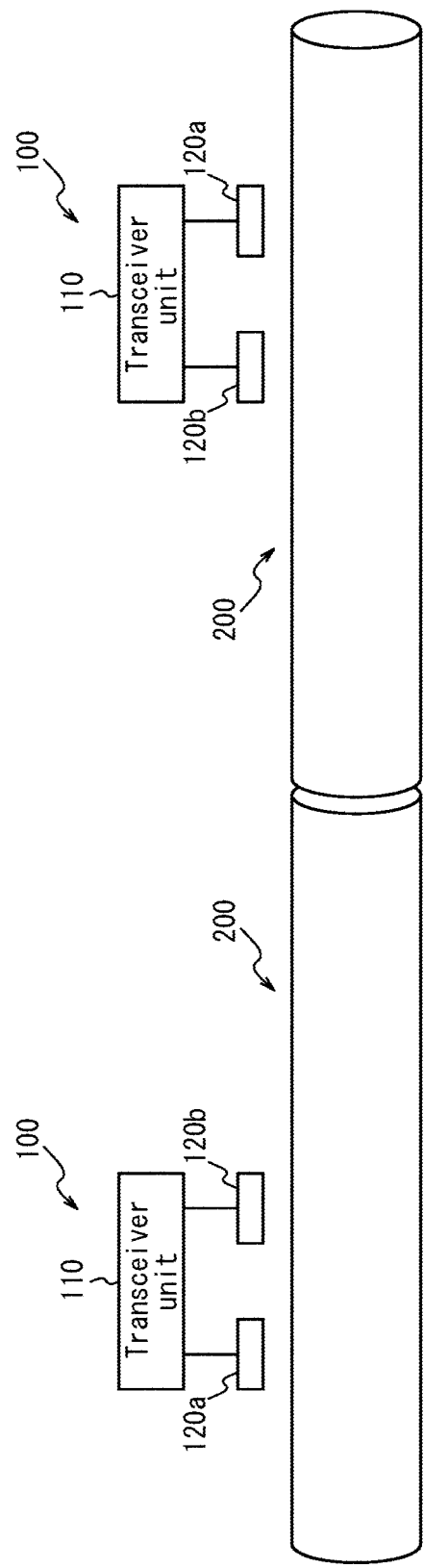
FIG. 11 illustrates an example, in which communication is not established, of coupling dielectrics to which respective transmission apparatuses are coupled.

When coupling together dielectrics 200 to which transmission apparatuses 100 are coupled, the first regions 200a do not function as a terminal line when the second regions 200b of the dielectrics 200 are coupled together, for example as illustrated in FIG. 11, and communication is not established. Furthermore, when the first region 200a of one dielectric 200 is coupled to the second region 200b of the other dielectric 200, the first region 200a of the other dielectric 200 does not function as a terminal line, and communication is not established.

In the above-described high frequency transmission system, a human body can be used as the dielectric 200. In other words, the high frequency transmission system can be configured by coupling the transmission apparatus 100 to a human body, which is a dielectric. The case of using a human body as the dielectric 200 is described in detail below.

Figure 12:
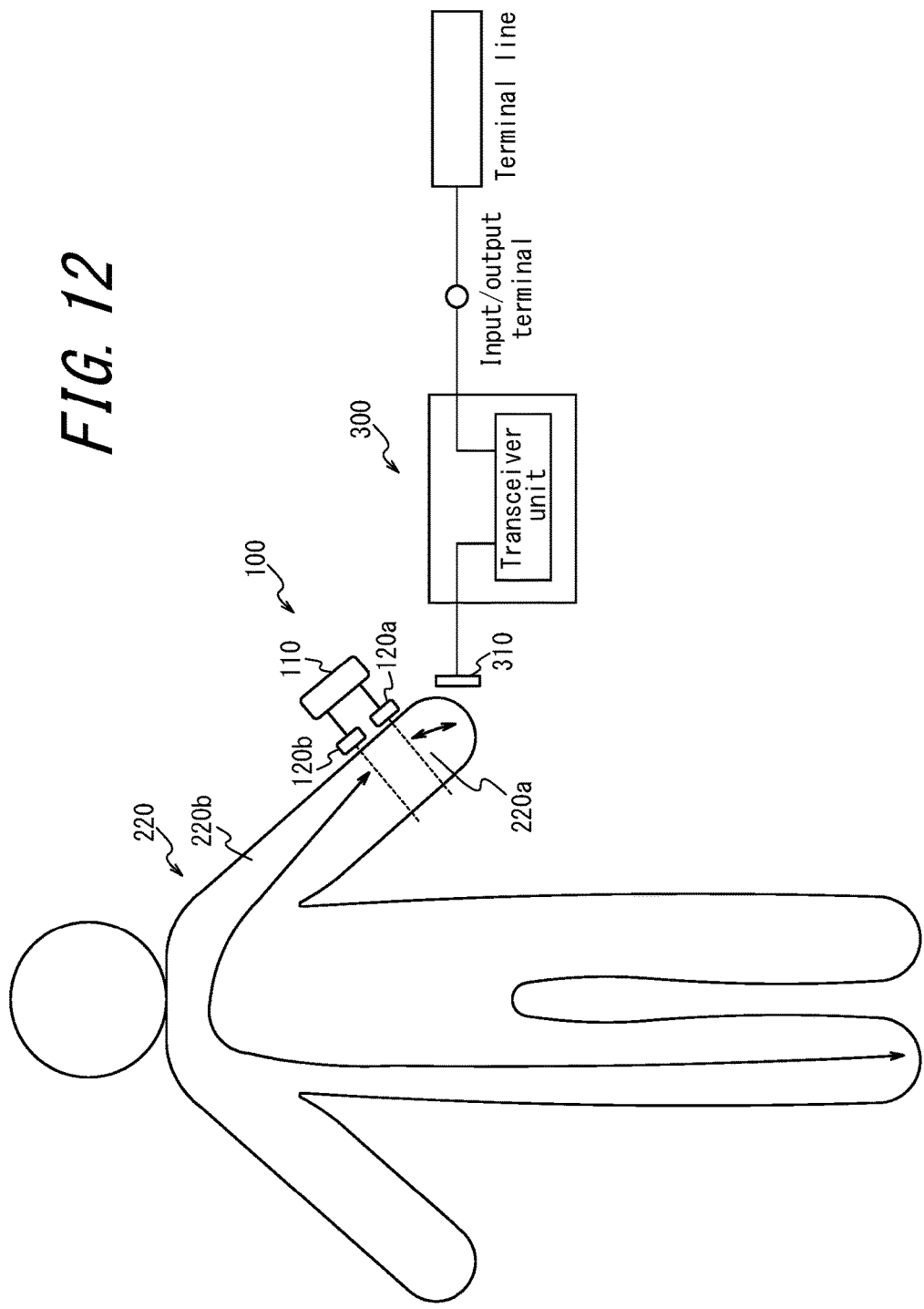
FIG. 12 illustrates an example high frequency transmission system configured by connecting the transmission apparatus of FIG. 6 to a human body.

FIG. 12 illustrates an example high frequency transmission system configured by coupling the transmission apparatus 100 of FIG. 6 to a human body 220, which is a dielectric. In the case of using the human body 220 as a dielectric, the coupling electrodes 120 couple with the human body 220 by the transmission apparatus 100 being worn on a finger, arm, or the like of the human body, for example. At this time, the two coupling electrodes 120 couple to the human body 220 so as to be side-by-side in a direction from the torso side towards the distal side of the arm. When coupling the transmission apparatus 100 to the human body 220, the transmission apparatus 100 may, for example, be formed as a ring, wristband, armband, or the like that is wearable on a finger, hand, or arm.

In the case of using the human body 220 as a dielectric, the transmission apparatus 100 uses a signal with a predetermined frequency so that the region from one coupling electrode 120a, of the two coupling electrodes 120, at the distal side to the end (for example, the fingertip) becomes the first region 200a illustrated in FIG. 7, and the region from the other coupling electrode 120b at the torso side to the entire arm, torso, and leg becomes the second region 200b illustrated in FIG. 7.

Figure 3:
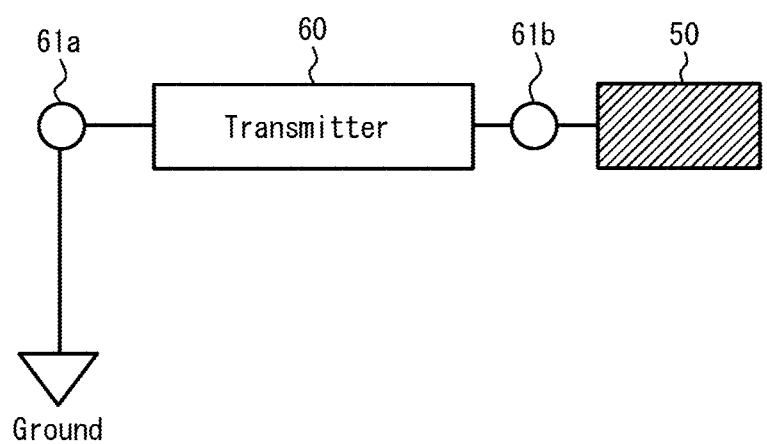
FIG. 3 schematically illustrates operation of the transmission apparatus in FIG. 2.
Figure 13:
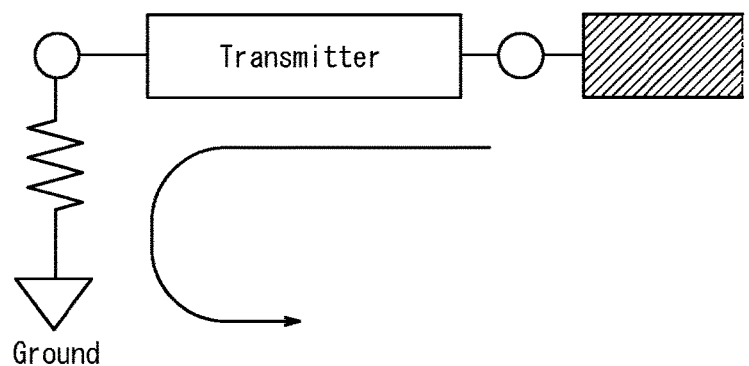
FIG. 13 is a schematic circuit diagram related to a transmission apparatus and a dielectric in a high frequency transmission system configured using a human body as a dielectric.

When a dielectric such as the human body 220 with a large loss is used as the terminal line, resistance is added to the schematic diagram in FIG. 3, yielding a circuit such as the one represented schematically in FIG. 13. In this case as well, current flows to the output terminals 61a and 61b of the transmitter 60, and a high frequency signal or electric power can be transmitted from the transmitter 60 to the receiver 70 through the transmission medium 50.

Figure 14A:
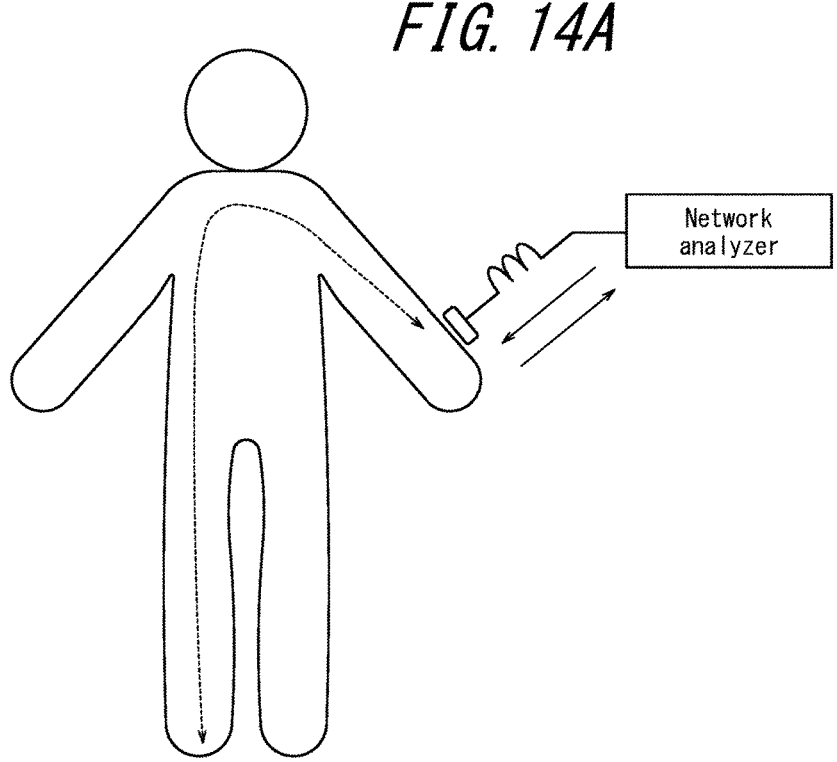
FIG. 14A and FIG. 14B illustrate measurement of S11 (return loss) of a human body that is a dielectric.
Figure 14B:
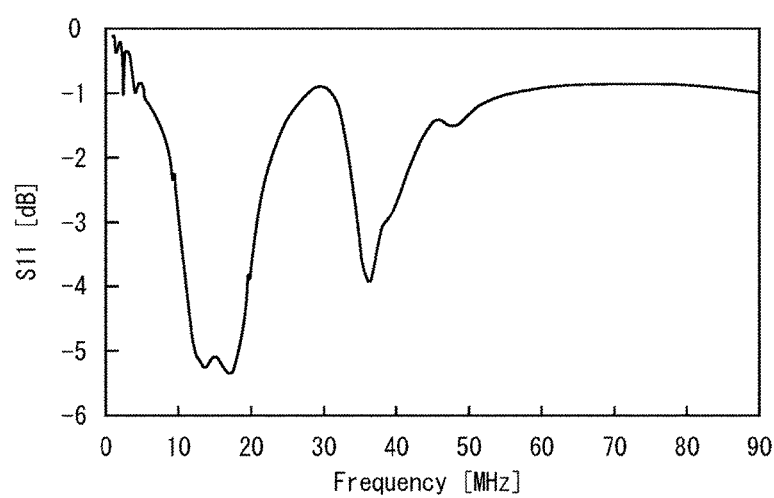

Here, measurement of S11 (return loss) of a human body that is a dielectric is described. FIG. 14A schematically illustrates an example of measuring S11, whereby S11 is measured using a network analyzer for a 165 cm tall human body to which a coupling electrode is coupled to a wrist through an inductor. FIG. 14B illustrates the result of measuring S11 with the method illustrated in FIG. 14A.

As seen in FIG. 14B, S11 decreases and current flows to the coupling electrode when the frequency is approximately 14 MHz and roughly three times that value, i.e. around 39 MHz. The frequency (approximately 14 MHz) yielding the first local minimum when the frequency is increased from zero Hz corresponds to an electrical length of 90° for the region from the coupling electrode to the entire arm, torso, and leg. The frequency of 39 MHz corresponds to an electrical length of 270° for this region. Since the ranges at which the second region 200b effectively functions as a terminal line are 90±45° and 270±45°, i.e. 45° to 135° and 225° to 315°, the second region 200b functions effectively as a terminal line for a signal with a frequency of 7 MHz to 21 MHz and 33 MHz to 45 MHz when the second region 200b is the region from the coupling electrode to the entire arm, torso, and leg.

When using the human body 220 as a dielectric on the basis of the above method, the transmission apparatus 100 can, for example, use a signal with a frequency of 13.56 MHz. When the frequency is 13.56 MHz and the human body 220 is a dielectric, then coupling the coupling electrode 120b on the torso side to the human body 220 near a wrist yields an electrical length of approximately 90° as the length of the second region and an electrical length of less than 45° as the length of the first region in a human body 220 of typical adult height (such as 170 cm). The frequency of the signal used by the transmission apparatus 100 is assumed below to be 13.56 MHz. Furthermore, the region from the coupling electrode 120a on the distal side to the end (for example, the fingertip) is referred to as the distal side 220a of the human body 220, and the region from the coupling electrode 120b on the torso side to the entire arm, torso, and leg is referred to as the torso side 220b of the human body 220.

When a fingertip, for example, of the human body 220 wearing the transmission apparatus 100 touches the coupling electrode 310 of the other transmission apparatus 300, the human body 220 and the coupling electrode 310 couple, establishing a high frequency transmission system. In other words, since a standing wave is generated on the torso side 220b of the human body 220 and a virtual ground is formed during communication, the torso side 220b functions as a terminal line. The distal side 220a functions as a transmission medium. On the other hand, the distal side 220a does not function as a terminal line and communication is not established when the torso side 220b of the human body 220 couples to the coupling electrode 310.

In other words, the human body 220 wearing the transmission apparatus 100 can restrict the range allowing establishment of communication by coupling to the coupling electrode 310 so that the range is only the distal side 220a of a hand, for example. Consequently, the region allowing establishment of communication can be restricted, reducing the likelihood of unintended communication and facilitating prevention of unintended information leaks. The transmission apparatus 100 can therefore improve safety.

Next, ways of wearing the transmission apparatus 100 on the human body 220 are described. When the transmission apparatus 100 is worn and the high frequency signals are transmitted and received through the human body 220 by the human body 220 coupling with the coupling electrodes 120a and 120b, the coupling becomes stronger, which increases the transmission efficiency and communication reliability, as the area of the coupling electrodes 120a and 120b is greater and as the distance between the human body 220 and the coupling electrodes 120a and 120b is smaller. However, when the transmission apparatus 100 is configured as an accessory, such as a ring, wristband, or armband, design constraints of the accessory may prevent an increase in the area of the coupling electrodes 120a and 120b. Furthermore, when wearing an accessory that includes the transmission apparatus 100, as illustrated schematically in FIG. 15A, for example, a gap h might exist between the coupling electrodes 120a and 120b and the human body 220, so that the coupling electrodes 120a and 120b do not touch the skin.

To strengthen the coupling between the human body 220 and the coupling electrodes 120a and 120b, the coupling electrodes 120a and 120b may be provided in close contact with a support 130 that is formed by a dielectric and has a greater area than the coupling electrodes 120a and 120b, and the support 130 may be mounted on the accessory, as illustrated schematically in FIG. 15B, for example. In this case, the human body 220 and the coupling electrodes 120a and 120b are coupled through the support 130 on the human body 220 that is wearing the accessory. By the accessory thus including the support 130, the coupling electrodes 120a and 120b are placed in close contact with the support 130 in advance, and the support 130 couples with the human body 220 over a larger area than the coupling electrodes 120a and 120b. Consequently, when the human body 220 wears the accessory, the human body 220 and the support 130 are coupled strongly, and a high frequency signal can be transmitted and received more efficiently than if the accessory did not include the support 130, even when a gap h exists between the skin of the human body 220 and the support 130. The accessory itself may be formed as the support 130.

Figure 16A:
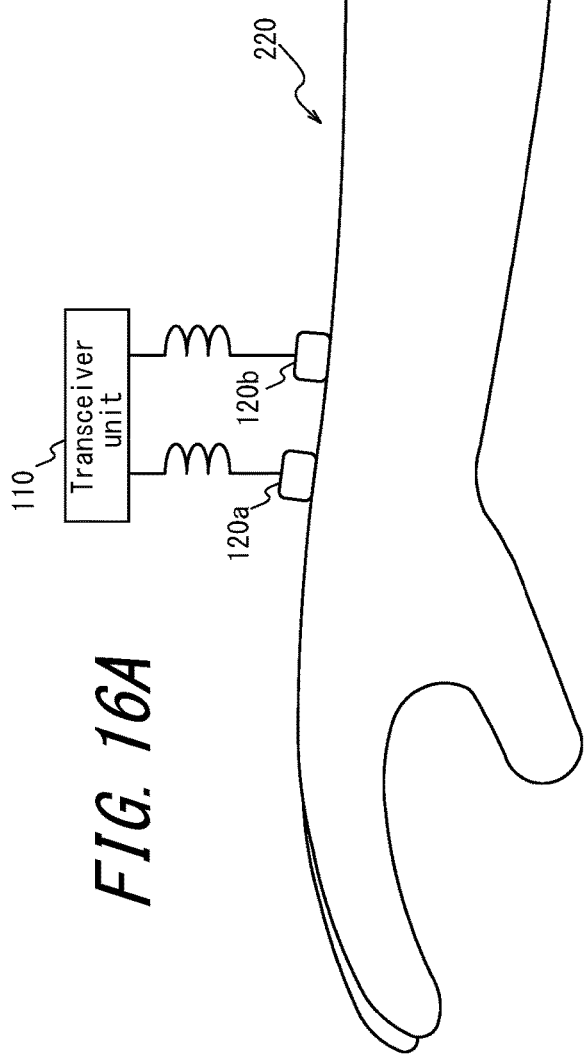
FIG. 16A and FIG. 16B schematically illustrate another example of wearing a transmission apparatus on a human body.
Figure 16B:
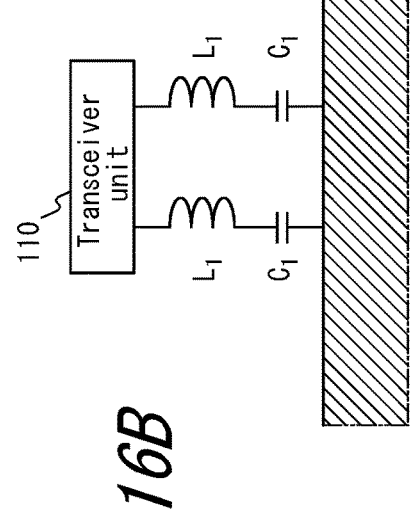

As illustrated schematically in FIG. 16A and FIG. 16B, for example, the coupling strength between the coupling electrodes 120a and 120b and the human body 220 can be increased by inserting an inductor between each of the coupling electrodes 120a and 120b and the transceiver 110 and generating LC series resonance with the inductance (L) of the inductor and the capacitance (C) between the coupling electrodes 120a and 120b and the skin. This is because of the same principle as described with reference to FIG. 5B.

As in the case described with reference to FIG. 5B, the values of L1 and C1 at which the coupling strength increases by generation of LC series resonance at frequency f satisfy Expression (2) below, where f is the frequency of the high frequency signal to be transmitted, L1 is the inductance, and C1 is the capacitance between the coupling electrodes and the human body.

$$2\pi f = \frac{1}{\sqrt{L_1 C_1}} \quad (2)$$

FIGS. 15A and 15B and FIGS. 16A and 16B illustrate the coupling electrodes 120a and 120b coupled to the human body 220 on the back side of a hand of the human body 220, but the coupling electrodes 120a and 120b and the human body need not be coupled on the back side of a hand. For example, as illustrated in FIG. 17, the coupling electrodes 120a and 120b may be coupled to the human body 220 on the palm side of a hand of the human body 220. In particular when communication is achieved by the pad of a finger, the palm of a hand, or the like of the human body 220 touching another transmission apparatus, then by the coupling electrodes 120a and 120b and the human body 220 coupling on the palm side of the hand, as illustrated in FIG. 17, as opposed to coupling at the back side of the hand, the distance from the point of input/output of a high frequency signal (the point where the coupling electrodes 120a and 120b couple to the human body 220) to the coupling electrodes 120a and 120b decreases.

Furthermore, when the transmission apparatus 100 is mounted in an accessory, the coupling electrodes 120a and 120b may be formed in a ringed shape and wound around a wrist, finger, or the like of the human body 220. FIGS. 18A and 18B illustrate an example of forming the coupling electrodes 120a and 120b in a ring shape to wrap around a wrist of a human body. By forming the coupling electrodes 120a and 120b in a ring shape in this way, the distance between the coupling electrodes 120a and 120b from the perspective of the high frequency signal can be maintained constant.

For example, as illustrated in FIGS. 19A and 19B, when the coupling electrodes 120a and 120b couple with the human body 220 only at a portion (such as the top) of the area around the wrist, the distance between the coupling electrodes 120a and 120b from the perspective of the high frequency signal changes depending on which portion of the distal side 220a of the human body 220 couples with the other transmission apparatus. Specifically, when the human body 220 couples with another transmission apparatus at the tip of the middle finger on the distal side 220a, then as illustrated in FIG. 19A, the distance d between the coupling electrodes 120a and 120b from the perspective of the high frequency signal conducted through the human body 220 is substantially equivalent to the distance D between the coupling electrodes 120a and 120b. On the other hand, when the human body 220 couples with another transmission apparatus at the base of the thumb on the distal side 220a, then as illustrated in FIG. 19B, the distance d between the coupling electrodes 120a and 120b from the perspective of the high frequency signal conducted through the human body 220 is shorter than the distance D between the coupling electrodes 120a and 120b.

In contrast, if the coupling electrodes 120a and 120b are formed in a ring shape and wrapped around the human body 220 (a wrist) to couple to the human body 220, then as illustrated in FIGS. 18A and 18B, the distance d between the coupling electrodes 120a and 120b from the perspective of the high frequency signal conducted through the human body 220 is substantially equivalent to the actual distance D between the coupling electrodes 120a and 120b, regardless of whether the human body 220 couples with another transmission apparatus at the tip of the middle finger on the distal side 220a or at the base of the thumb on the distal side 220a. In this way, by forming the coupling electrodes 120a and 120b as a ring shape, the distance d between the coupling electrodes 120a and 120b from the perspective of the high frequency signal can more easily be kept constant regardless of the position where the distal side 220a of the human body 220 touches another transmission apparatus for input/output of a high frequency signal. In particular, when the distance D between two coupling electrodes 120a and 120b is short because of design constraints or the like, the coupling electrodes 120a and 120b may couple to each other and short circuit, and the voltage necessary for communication may not be attainable between the input/output terminals of the transmission apparatus 100. However, by forming the coupling electrodes 120a and 120b in a ring shape, the distance d between the coupling electrodes 120a and 120b from the perspective of the high frequency signal conducted through the human body 220 can more easily be kept to the actual distance D between the coupling electrodes 120a and 120b.

Figure 20:
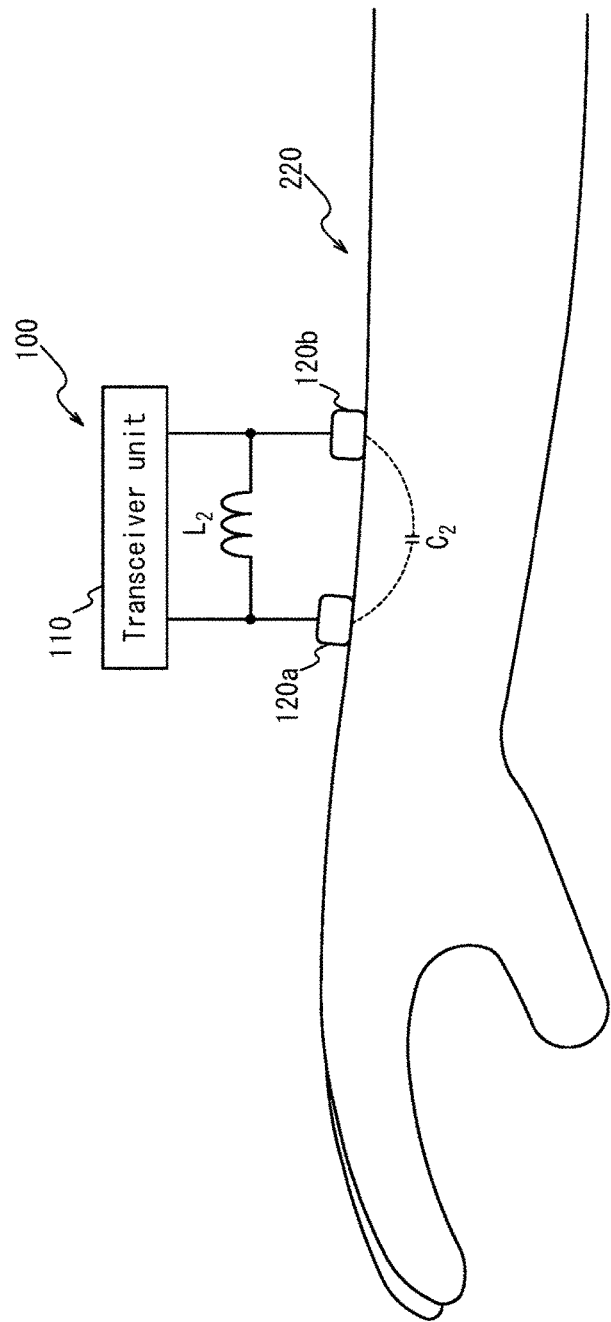
FIG. 20 schematically illustrates an example of a transmission apparatus that includes a notch filter.

In the transmission apparatus 100, an inductor may be connected between the two coupling electrodes 120a and 120b to form a notch filter, as illustrated schematically in FIG. 20, for example. By connecting an inductor with a predetermined inductance to form a notch filter, the isolation between the two coupling electrodes 120a and 120b can be improved.

Specifically, a high frequency signal at frequency f can be blocked and the isolation between the coupling electrodes increased more easily by connecting an inductor that satisfies Expression (3) below, where f is the frequency of a high frequency signal or electric power to be transmitted, C2 is the capacitance between the two coupling electrodes 120a and 120b that couple to the human body, and L2 is the inductance of the inductor connected between the coupling electrodes 120a and 120b.

$$2\pi f = \frac{1}{\sqrt{L_2 C_2}} \quad (3)$$

Figure 21:
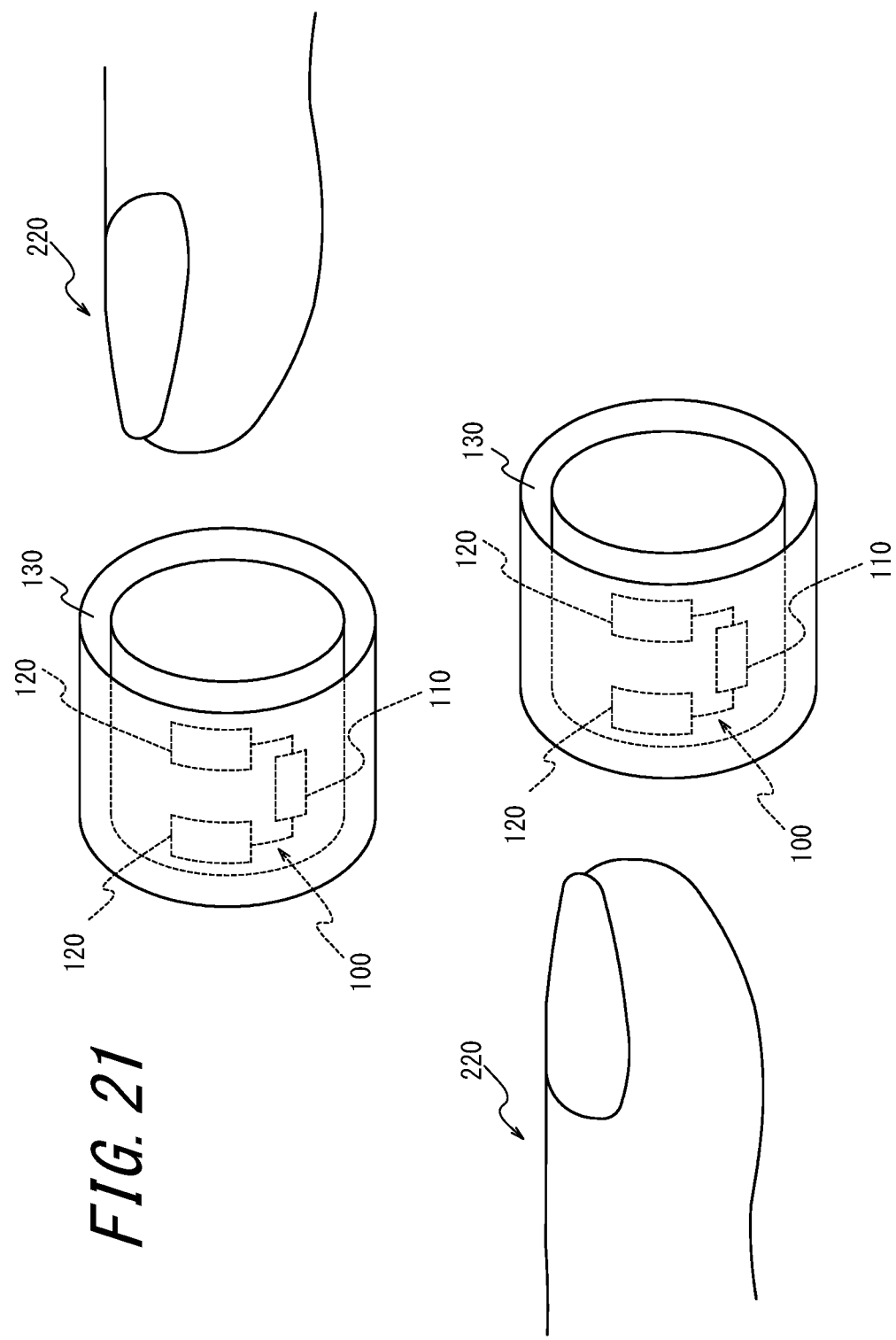
FIG. 21 schematically illustrates an example of the arrangement of coupling electrodes in a support.

Furthermore, the support 130 configured as an accessory including the transmission apparatus 100 may be formed in a tubular shape, as illustrated in FIG. 21, so that the support 130 is worn at a position such that the electrical length of the torso side 220b of the human body 220, which is a dialectic, is substantially 90°. FIG. 21 illustrates a particular example of the accessory (support 130) being a ring. In the support 130 illustrated in FIG. 21, the two coupling electrodes 120 are provided along the central axis of the tubular support 130 at symmetrical positions in the longitudinal direction of the dielectric when the support 130 is coupled to the dielectric. By configuring the input/output circuit of the transceiver 110 as a balanced circuit, the support 130 can be configured to allow communication regardless of the direction from which the support 130 is worn.

By configuring the transmission apparatus 100 in the accessory (support 130) in this way, the communication performance does not change in accordance with the position or direction in which the accessory is worn on the body. Therefore, stable communication can be achieved even if no attention is paid to the position or direction in which the human body 220 wears the accessory.

As described above, by coupling the transmission apparatus 100 to a finger, hand, or arm of the human body 220, communication is established when another transmission apparatus is coupled on the distal side 220a of the coupling position of the transmission apparatus 100 and is not established when the other transmission apparatus is coupled on the torso side 220b. In this way, the region of the human body 220 in which communication is established can be restricted.

An embodiment of the present disclosure has been described in detail. A person of ordinary skill in the art, however, could make modifications or substitutions to the above embodiment without departing from the scope of the present disclosure. In other words, the present disclosure is not limited to the above embodiment, and a variety of modifications and changes are possible. For example, the functions and the like included in the various components may be reordered in any logically consistent way. Furthermore, components may be combined into one or divided.

The matter disclosed in the present disclosure is not intended to be all-encompassing. That is, the present disclosure does not deny the existence of subject matter not claimed in the present disclosure, i.e. the existence of subject matter of a later divisional application or subject matter to be added by amendment.

The present disclosure includes examples for the purpose of illustration but is not to be considered limited by the content of such examples.

REFERENCE SIGNS LIST

10 High frequency transmission system
11, 12, 101 High frequency transmission apparatus
40 Terminal line
40a, 40b Terminal line
50 Transmission medium
60 Transmitter
61a, 61b Output terminal
62 Coupling electrode
70 Receiver
71a, 71b Input terminal
100 Transmission apparatus
100a First region
110 Transceiver
120, 120a, 120b, 310 Coupling electrode
130 Support
200 Dielectric
200a First region
200b Second region
210a First bottom
210b Second bottom
220 Human body
220a Distal side
220b Torso side
300 Other transmission apparatus

The invention claimed is:

1. A transmission apparatus comprising:
a communication unit comprising two input/output terminals configured to input and output an electrical signal of a predetermined frequency; and
two coupling electrodes each configured to couple to the two input/output terminals and to couple to one transmission medium so as to be side-by-side in a longitudinal direction of the transmission medium; wherein
an input/output circuit of the communication unit is configured by a balanced circuit capable of causing the two coupling electrodes to function interchangeably;
the two coupling electrodes are arranged along the longitudinal direction of the transmission medium, when coupled to the transmission medium, at positions symmetrical with respect to a plane orthogonal to a direction in which the electrical signal flows; and
when a length from one coupling electrode of the two coupling electrodes to one end of the transmission medium in the longitudinal direction thereof is an electrical length in a range of (2n·90±45)°, where n is an integer of at least 0, of the electrical signal and a length from another coupling electrode of the two coupling electrodes to another end of the transmission medium in the longitudinal direction thereof is an electrical length in a range of ((2n+1)·90±45)° of the electrical signal while the two coupling electrodes are coupled to the transmission medium, the communication unit transmits and receives the electrical signal to and from another transmission apparatus, coupled to a range of the transmission medium having an electrical length in a range of (2n·90±45)° of the electrical signal, by a region of the transmission medium, from a position where the another coupling electrode is coupled to the another end, functioning as ground when the two coupling electrodes are coupled to the transmission medium.

2. The transmission apparatus of claim 1, further comprising:
a support having a greater area than an area of a coupling surface between the two coupling electrodes and the transmission medium, the support being in close contact with the two coupling electrodes; wherein
the two coupling electrodes couple to the transmission medium through the support.

3. The transmission apparatus of claim 1, further comprising an inductor between the communication unit and each of the two coupling electrodes.

4. The transmission apparatus of claim 1, wherein the two coupling electrodes each have a ring shape.

5. The transmission apparatus of claim 1, further comprising an inductor between the two coupling electrodes.

6. The transmission apparatus of claim 1, wherein the transmission medium is a conductor or a dielectric.

7. A transmission method for a transmission apparatus,
the transmission apparatus comprising a communication unit comprising two input/output terminals configured to input and output an electrical signal of a predetermined frequency, and two coupling electrodes each configured to couple to the two input/output terminals and to couple to one transmission medium so as to be side-by-side in a longitudinal direction of the transmission medium;
an input/output circuit of the communication unit being configured by a balanced circuit capable of causing the two coupling electrodes to function interchangeably;
the two coupling electrodes being arranged along the longitudinal direction of the transmission medium, when coupled to the transmission medium, at positions symmetrical with respect to a plane orthogonal to a direction in which the electrical signal flows;
the transmission method comprising:
the communication unit transmitting and receiving the electrical signal, when a length from one coupling electrode of the two coupling electrodes to one end of the transmission medium in the longitudinal direction thereof is an electrical length in a range of $(2n \cdot 90 \pm 45)°$, where n is an integer of at least 0, of the electrical signal and a length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the electrical signal being transmitted and received to and from another transmission apparatus, coupled to a range of the transmission medium having an electrical length in a range of $(2n \cdot 90 \pm 45)°$ of the electrical signal, by a region of the transmission medium, from a position where the another coupling electrode is coupled to the another end, functioning as ground when the two coupling electrodes are coupled to the transmission medium.

8. A transmission system comprising:
a transmission apparatus comprising a communication unit, comprising two input/output terminals configured to input and output an electrical signal of a predetermined frequency, and two coupling electrodes each configured to couple to the two input/output terminals and to couple to one transmission medium so as to be side-by-side in a longitudinal direction of the transmission medium, an input/output circuit of the communication unit being configured by a balanced circuit capable of causing the two coupling electrodes to function interchangeably, and the two coupling electrodes being arranged along the longitudinal direction of the transmission medium, when coupled to the transmission medium, at positions symmetrical with respect to a plane orthogonal to a direction in which the electrical signal flows; and
another transmission apparatus comprising a communication unit and a coupling electrode, the communication unit comprising an input/output terminal configured to input and output an electrical signal of a predetermined frequency, and the coupling electrode being coupled to the input/output terminal, wherein
when a length from one coupling electrode of the two coupling electrodes of the transmission apparatus to one end of the transmission medium in the longitudinal direction thereof is an electrical length in a range of $(2n \cdot 90 \pm 45)°$, where n is an integer of at least 0, of the electrical signal and a length from another coupling electrode of the two coupling electrodes to another end of the transmission medium in the longitudinal direction thereof is an electrical length in a range of $((2n+1) \cdot 90 \pm 45)°$ of the electrical signal while the two coupling electrodes are coupled to the transmission medium, the transmission apparatus transmits and receives the electrical signal to and from the another transmission apparatus, coupled to a range of the transmission medium having an electrical length in a range of $(2n \cdot 90 \pm 45)°$ of the electrical signal, by a region of the transmission medium, from a position where the another coupling electrode is coupled to the another end, functioning as ground when the two coupling electrodes are coupled to the transmission medium.

* * * * *